United States Patent [19]

Neff

[11] 4,381,797

[45] May 3, 1983

[54] FLOW CONTROL VALVE WITH A NON-RISING STEM

[75] Inventor: James A. Neff, Bloomfield Township, Oakland County, Mich.

[73] Assignee: MAC Valves, Inc., Wixom, Mich.

[21] Appl. No.: 232,834

[22] Filed: Feb. 9, 1981

[51] Int. Cl.³ .............................................. F16K 15/02

[52] U.S. Cl. ...................................... 137/599; 91/443; 251/266

[58] Field of Search .......................... 137/599; 91/443; 251/266, 267

[56] References Cited

U.S. PATENT DOCUMENTS

| | | | |
|---|---|---|---|
| 2,722,236 | 11/1955 | Zee | 251/266 X |
| 3,085,592 | 4/1963 | Zajac | 137/599 X |
| 3,289,694 | 12/1966 | Frye | 137/599 X |
| 3,349,796 | 10/1967 | Scholin | 137/599 X |
| 3,686,092 | 8/1972 | Stehlin | 137/599 X |
| 4,147,179 | 4/1979 | Miura | 91/443 X |

FOREIGN PATENT DOCUMENTS

| | | | |
|---|---|---|---|
| 46-23093 | 7/1971 | Japan | 251/266 |

*Primary Examiner*—Robert G. Nilson
*Attorney, Agent, or Firm*—Robert G. Mentag

[57] ABSTRACT

A fluid flow control valve having an upstream port and a downstream port interconnected by a single flow path. An adjustable fluid flow control valve is mounted in said flow path for providing a meter out action on pressurized fluid flowing through said flow path from said downstream port to said upstream port. The fluid flow control valve has a non-rising stem. A check valve is mounted in said flow path in parallel with said fluid flow control valve and operative to allow a free flow of fluid when fluid flows from the upstream port to the downstream port.

6 Claims, 15 Drawing Figures

FLOW CONTROL VALVE WITH A NON-RISING STEM

TECHNICAL FIELD

This invention relates generally to a flow control valve, and more particularly, to a flow control valve which provides the functions of a free flow of fluid in one direction, and a metered flow of fluid in the other direction, and with a non-rising stem for adjusting the metering function of the valve. The flow control valve is adapted for many uses, as, for example, to provide a metered flow of fluid to the atmosphere, to a fluid motor or the like, or it can be used as a reversing valve whereby a free flow of fluid is allowed in one direction and a metered flow of fluid is provided in the other direction.

BACKGROUND ART

It is known in the valve art to provide flow control valves which provide a metered flow of fluid in one direction, and a free flow of fluid in the other direction. Examples of such prior art flow control valves are shown and described in U.S. Pat. Nos. Re. 29,292; 2,501,483; 3,376,792; 3,400,735; 3,621,867; 4,147,179; 4,177,840; 4,195,,552 and 4,182,360.

Because of the complexity of the structural arrangements of the prior art flow control valves shown and described in the aforecited patents, extra space must be provided for installation and operation of the same. Said prior art flow control valves require axially movable adjustment stems for adjusting the flow control structures in said valves, and extra space or room must be provided for such adjusting actions. The requirement of extra space for adjusting the prior art flow control structures is a disadvantage since in many instances, the amount of space available for installing and operating a flow control valve is limited.

DISCLOSURE OF THE INVENTION

In accordance with the present invention, a flow control valve is provided which can be installed in any fluid pressure line that is conducting fluid under pressure to or from a fluid cylinder, or the like. The flow control valve includes an adjustable flow control valve for providing a metered flow of fluid in one direction, and a free flow of fluid in the other direction. The flow control valve also includes a check valve mounted in parallel with the flow control valve and movable to a closed position when fluid is flowing through the valve in said one direction to permit said metered flow of fluid, and movable to an open position when fluid is flowing through the valve in the said other direction to allow said free flow of fluid through the valve.

The flow control valve includes a flow control valve element and a non-rising stem for adjusting the position of the flow control valve element. The non-rising stem is constructed and arranged for rotatable engagement with the flow control valve element for adjusting the same, but it does not move axially during the adjusting operation. The non-rising stem structure provides a flow control valve which is more compact than the prior art flow control valves, and it may be incorporated as part of a machine tool, or other machinery in areas where the space for mounting such a valve is at a minimum.

BEST MODE OF CARRYING OUT THE INVENTION

Figure 1:
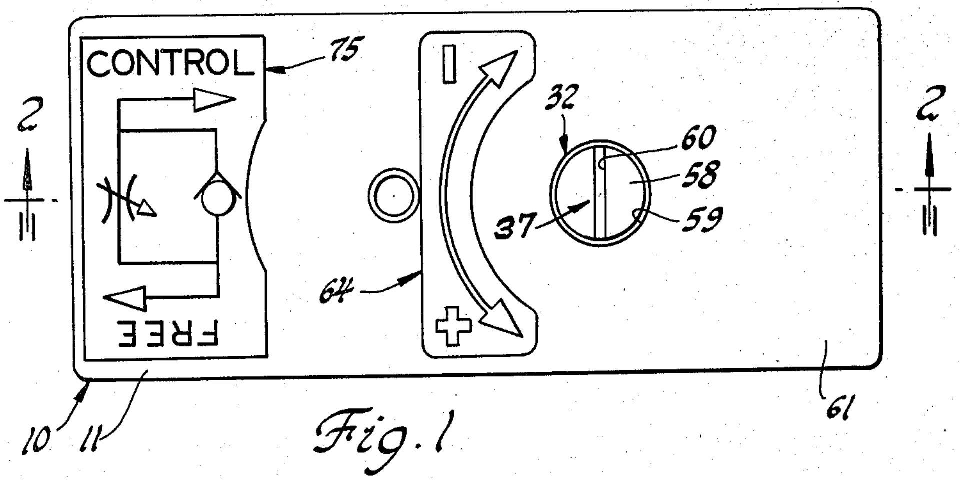
FIG. 1 is a top plan view of a first embodiment of a flow control valve with a non-rising stem made in accordance with the principles of the present invention.

Referring now to the drawings, and in particular to FIGS. 1 through 4, the numeral 10 generally designates a first illustrative embodiment of a flow control valve with a non-rising stem, made in accordance with the principles of the present invention. The valve 10 includes a valve body 11, and a bottom cover plate 12 which is secured to the body 11 by a plurality of suitable machine screws 13. A suitable bottom plate gasket 14 is disposed between the bottom of the valve body 11 and the bottom cover plate 12.

The valve 10 is provided with a first threaded port 18 which communicates with an inwardly extended upper passageway 19 that is formed longitudinally in the valve body 11. A first circular orifice, or valve seat 20, is formed through a dividing wall 17, and it communicates the upper passageway 19 with a lower passageway 21. The lower passageway 21 communicates through openings 22, on either side of a supporting member 23, with a passagewaay 24 that communicates with a second threaded port 25. If the first port 18 is connected to a source of pressurized fluid, it may be called an upstream, a supply, or inlet port, and the second port 25 may be called a downstream or outlet port. It will be understood that line pressure may also be introduced through the second port 25 to reverse the functions of the first port 18 and the second port 25. The upper passageway 19 also communicates with a lower passageway 21 through a second circular orifice 28 which has a tapered valve seat 29 formed around the lower edge thereof.

The valve 10 includes a flow control valve assembly, generally indicated by the numeral 32, and a check valve assembly, generally indicated by the numeral 33. The flow control valve assembly 32 includes a flow control valve element, generally indicated by the numeral 36 which is adjustable by a metering stem, generally indicated by the numeral 37.

Figure 4:
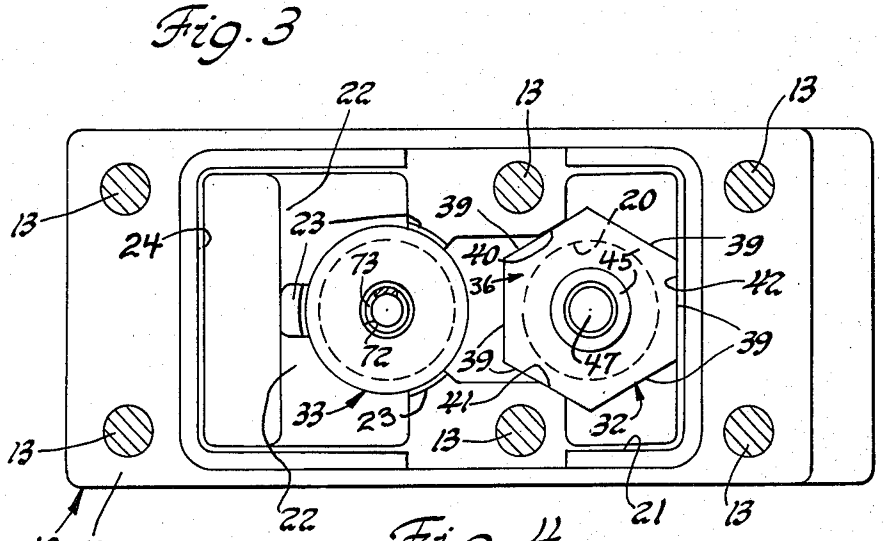
FIG. 4 is a bottom plan view of the valve structure illustrated in FIG. 1, taken along the line 4—4 thereof, and looking in the direction of the arrows.
Figure 6:
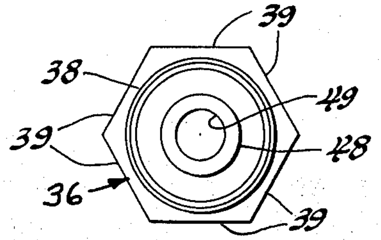
FIG. 6 is a top plan view of the needle valve illustrated in FIG. 5, taken along the line 6—6 thereof, and looking in the direction of the arrows.
Figure 7:
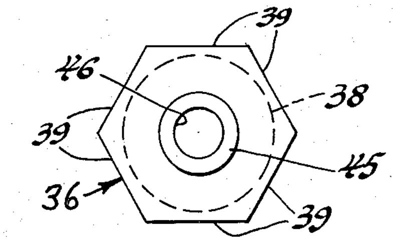
FIG. 7 is a bottom plan view of the needle valve structure illustrated in FIG. 5, taken along the line 7—7 thereof, and looking in the direction of the arrows.

The flow control valve element 36 includes a body portion 38 that has a conical side surface. An integral, laterally extended peripheral flange 35 is formed around the lower end of the valve element body 38 and it is provided with six flat surfaces 39 which are formed on planes parallel to the longitudinal axis of the flow control valve 32. As shown in FIG. 4, three of the flat surfaces 39 are adapted to slide on mating flat guide or bearing surfaces 40, 41 and 42 which are formed in the valve body 11 in the lower passageway 21. The flow control valve element 36 includes a lower axial tubular shaft 35 (FIG. 2) which is integral with the valve element body 38 and which is provided with a threaded bore 46 that extends upwardly into the body 38. The flow control valve element 36 includes an upper, tubular axial shaft 48 which has its lower end integral with the upper end of the valve element body 38 and which is provided with an unthreaded bore 49 that is larger than the diameter of threaded bore 46. The bore 49 extends through the tubular shaft 48 and into the upper end of the valve element body 38, and into communication with the inner end of the threaded bore 46.

The adjustable flow control valve stem 37 includes a stem shaft having a threaded lower end 47 which is integral with an intermediate non-threaded portion 50. The threaded lower end shaft portion 47 is extended through the unthreaded bore 49 in the valve element shaft 48 and into threaded engagement with the threaded bore 46. A suitable O-ring seal 51 is mounted on a peripheral groove around the lower end of the intermediate stem shaft portion 50, and it sealingly engages the sides of the unthreaded bore 49 in the valve element shaft 48. The flow control valve stem 37 further includes a stem head 58 which is integral with the upper end of the stem central shaft portion 50 and which is provided with a pair of axially spaced apart, radially extended, annular flanges 54. The flanges 54 form a groove in which is operatively mounted an O-ring seal 56 that sealingly engages a bore 57 which has its inner end communicating with the upper passageway 19. The outer end of the valve stem head 58 is rotatably mounted in a bore 59 which communicates at its outer end with the atmosphere, and at its inner end with the outer end of the larger bore 57. A cross slot 60 is formed in the outer end of the valve stem head 58 for the reception of a screw driver, or other tool for rotating the valve stem 37 for adjusting the position of the flow control valve element, 36.

Figure 2:
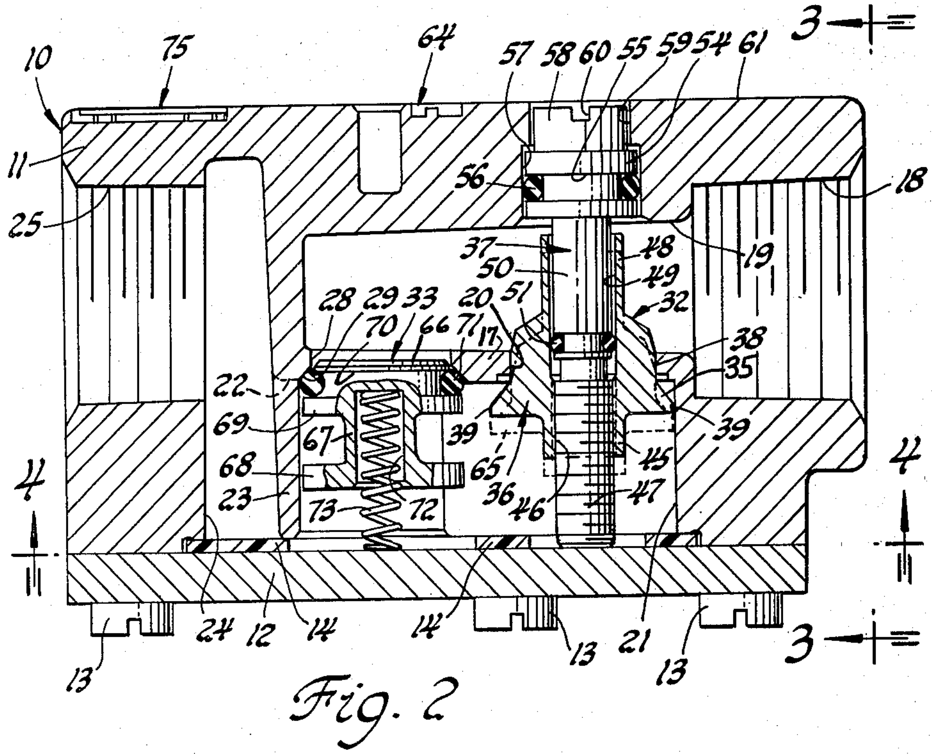
FIG. 2 is an elevational section view of the valve structure illustrated in FIG. 1, taken along the line 2—2 thereof, and looking in the direction of the arrows.
Figure 3:
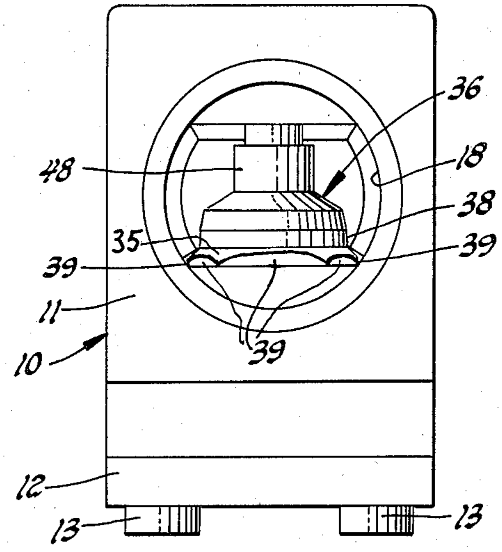
FIG. 3 is a right side elevation view of the valve structure illustrated in FIG. 1, taken along the line 3—3 thereof, and looking in the direction of the arrows.
Figure 5:
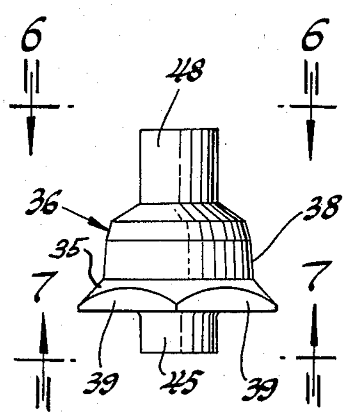
FIG. 5 is a side elevation view of a flow control needle valve employed in the valve structure of FIG. 1.

The numeral 61 designates the top end surface of the valve body 11 in FIGS. 1 and 2. The numeral 64 designates an arrow which is formed in the valve body top end surface 61, and which indicates the directions for adjusting the valve stem 37 for increasing or decreasing the flow of fluid past the flow control valve 32. The numeral 65, in FIG. 2, indicates by broken lines an adjusted position of the flow control valve element 36 when it is in an open position removed from the fully closed position shown in full lines in FIG. 2.

As shown in FIG. 2, the check valve 33 includes a cylindrical head portion 66 which has an integral, radially extended upper annular flange 69 on the lower end of which is integrally formed a central cylindrical valve body 67. A lower annular, radially extended flange 68 is integrally formed on the lower end of the valve body 67, and it has an outer diameter equal to the diameter of the flange 69. An annular groove 70 is formed around the periphery of the check valve head 66, above the upper flange 69, and an O-ring 71 is operatively mounted therein, which is normally adapted to be seated on the check valve seat 29 when the check valve 33 is in the closed position shown in FIG. 2. A longitudinally extended, axial bore 72 is formed through the valve body 67 and it extends inwardly from the lower end of the lower flange 68, and into the check valve head 66. A light spring 73 is operatively mounted in the bore 72, with its upper end abutting the inner end of the bore 72 and its lower end seated against the bottom cover plate 12.

As shown in FIG. 1, the numeral 75 generally designates indicia which is formed in the valve body top end surface 61 to show the direction of controlled flow of fluid through the valve 10 and the direction of free flow of fluid through the valve 10.

In use, assuming the valve 10 has the port 18 connected to a source of pressurized fluid the line pressure will flow into the port 18 and into the passageway 19. The flow control valve 32 would have been adjusted so that the flow control valve element 36 is moved downwardly to an open position, such as the broken line position indicated by the numeral 65 in FIG. 2. The pressurized fluid flows through the upper passageway 19 and the check valve 33 opens to permit a free flow of pressurized fluid through the circular orifice 28 and into the lower passageway 21 and thence through the passages 22 and 24, and out through the port 25. It will be understood, that the main fluid flow between the upper passageway 19 and the lower passageway 21 would be through the check valve orifice 28, but there would be a minimum amount of flow, in the last described direction, past the flow control valve element 36. When the flow of fluid through the valve 10 is reversed, the check valve 33 closes to block the flow path through orifice 28 and force the fluid past the metering flow control valve element 36. In the reverse direction, the fluid enters the port 25 and passes through the passageways 24, 22 and 21, and it is metered past the partially opened valve element 36 and into the upper passageway 19, and out the port 18.

It will be seen that by inserting a screw driver or other tool in the slot 60 in the valve stem head 58, the valve stem 37 may be rotated in a desired direction to turn the lower threaded end thereof in the threaded bore 46 of the valve element 36, so as to move the valve element 36 upwardly or downwardly to a desired adjusted metering position relative to the valve seat in the circular opening 20. The valve stem 37 does not move axially since it is restrained against movement outwardly of the valve body 11 because of the shoulder formed between the bore 59 and the larger diameter bore 57, and the upper flange 54 abutting the same, during a rotating movement of the valve stem 37. The valve element 36 is restrained against rotation because of the flat surfaces 39 being slidably mounted on the complementary parallel guide or bearing surfaces 40, 41 and 42. It will be seen that the overall height of the valve 10 does not change size when the position of the flow control element 36 is adjusted, due to the last described novel structure. The non-rising valve stem structure of the valve 10 permits the valve 10 to be employed in many areas on a machine tool where the prior art flow control valves would require more room because of the outward axial movement of their valve stems during an adjusting operation of the flow control structure.

Figure 8:
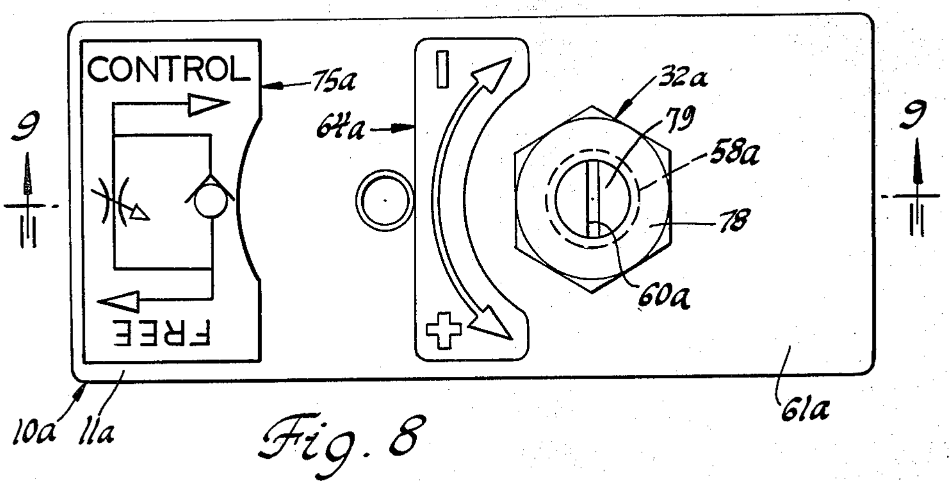
FIG. 8 is a top plan view of a second embodiment of the invention.
Figure 9:
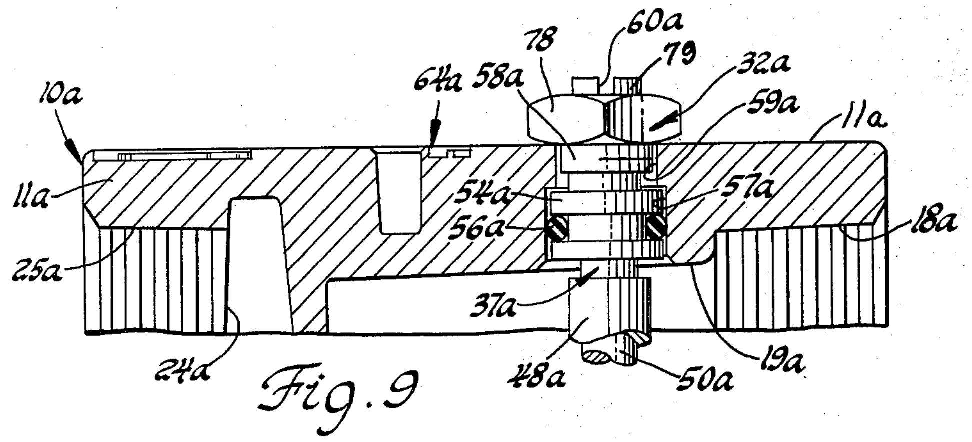
FIG. 9 is a fragmentary, elevation section view of the valve structure illustrated in FIG. 8, taken along the line 9—9 thereof, and looking in the direction of the arrows.

FIGS. 8 and 9 illustrate a second embodiment of the invention, and the parts thereof which are the same as the parts of the first embodiment of FIGS. 1 through 7 have been marked by the same reference numerals followed by the small letter "a". The valve **10*a* in FIGS. 8 and 9 employs the same valve body, check valve and flow control valve as used in the first embodiment. The valve 10*a* varies from the valve 10 of the first embodiment of FIGS. 1 through 7 in that the head 58*a* of the valve stem 37*a* is provided with an integral, axial, outwardly extended, reduced diameter extension portion 79 which is threaded and extends beyond the upper surface 61*a* of the valve body 11*a*. The threaded valve stem extension 79 is provided with a suitable lock nut 78 which is employed for locking the rotatable valve stem 37*a* in a desired adjusted position. However, it will be seen that the stem 37*a* is a non-rising stem since it can be rotated either clockwise or counter-clockwise as in the first embodiment, for adjusting the metering position of the associated valve element, without increasing the overall length of the valve stem 37*a* and the distance to which it extends above the upper end surface 11*a* of the valve 10*a***.

Figure 10:
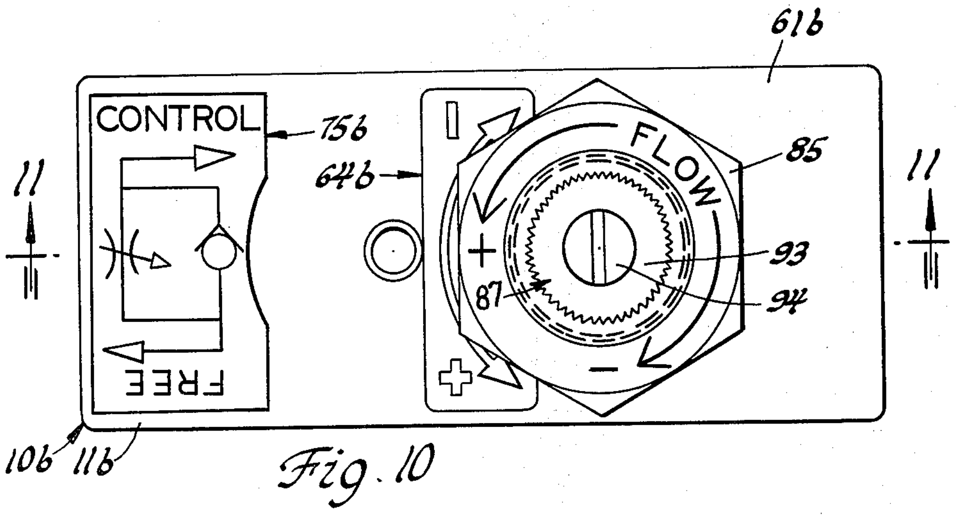
FIG. 10 is a top plan view of a third embodiment of the invention.
Figure 12:
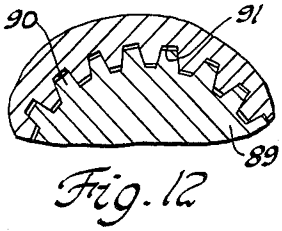
FIG. 12 is a fragmentary, horizontal section view of the valve structure illustrated in FIG. 11, taken along the line 12—12 thereof, and looking in the direction of the arrows.
Figure 11:
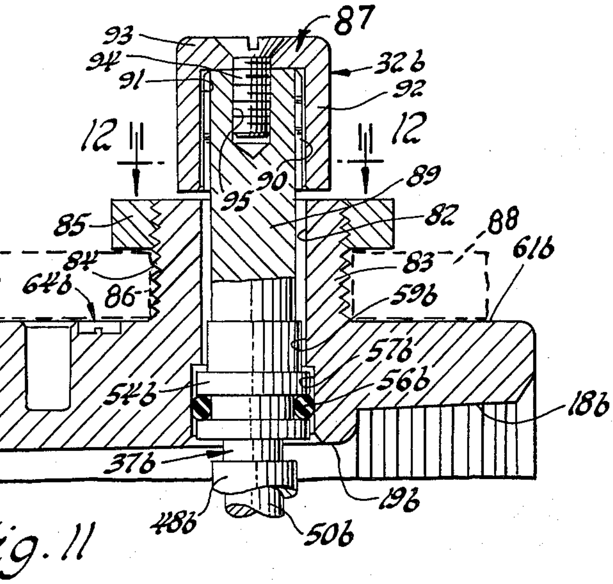
FIG. 11 is a fragmentary, elevation section view of the valve structure illustrated in FIG. 10, taken along line 11 thereof, and looking in the direction of the arrows.

FIGS. 10, 11 and 12 illustrate a third embodiment of the invention, and the parts of this embodiment which are the same as those of the embodiment of FIGS. 1 through 7 have been marked with the same reference numerals followed by the small letter "b". The valve **10*b* employs the same valve body, check valve and flow control valve as used in the first embodiment. The third embodiment of FIGS. 10, 11 and 12 is provided with a valve stem structure that extends a distance above the upper end 61*b* of the valve body 11*b* so as to provide a structure for releasably mounting the valve 10*b* in a mounting panel 88. The valve stem structure shown in FIGS. 10 and 11** is a non-rising stem structure in accordance with the invention.

As shown in FIG. 11, the non-rising valve stem **37*b* is provided with an integral, axial extension 89 which extends axially above the upper end surface 61*b* of the valve body 11*b*, and it extends through an integral tubular shaft 83 which is integral at its lower end with the valve body 11*b*. The valve stem extension 89 extends through a bore 82 formed through the tubular shaft 83. A mounting nut 85 is threadably mounted on the threaded periphery 84 of the tubular shaft 83. The tubular shaft 83 is adapted to be extended through a suitable opening 86 in a mounting panel 88 and be secured in place on the panel 88 by the mounting nut 85**.

As shown in FIG. 11, the valve stem extension 89 extends outwardly beyond the mounting nut 85, and the outer end portion thereof has formed thereon external splines 90 which are adapted to receive mating internal splines 91 that are formed in the tubular wall 92 of a flow control adjusting knob, generally indicated by the numeral 87. The upper end wall of the knob 87 is indicated by the numeral 93, and it has an opening therethrough, through which is extended a suitable retainer screw 94. The retainer screw 94 has its threaded shaft threadably mounted in a threaded bore 95 in the valve stem extension 89 for releasably securing the adjusting knob 87 in position on the valve stem extension 89. It will be seen that the valve stem **37*b* may be adjusted by means of the adjusting knob 87, in a desired direction, so as to move the associated flow control valve element either upwardly or downwardly, as desired, without increasing the overall length, or extension outwardly of the valve body 11*b*, of the valve stem 37*b*. As shown in FIG. 10, the outer periphery of the adjusting knob 87 is knurled to provide a good grip for manually turning the knob 87. The knob 87** may be made from any suitable material, as for example, a plastic material.

Figure 13:
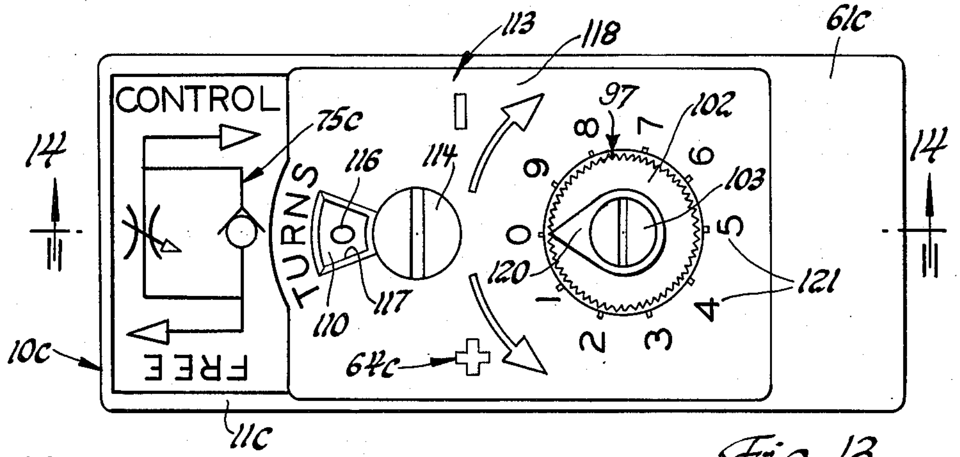
FIG. 13 is a top plan view of a fourth embodiment of the invention.
Figure 15:
FIG. 15 is a fragmentary, horizontal section view, with parts removed, of the structure illustrated in FIG. 14, taken substantially along the line 15—15 thereof, and looking in the direction of the arrows.
Figure 14:
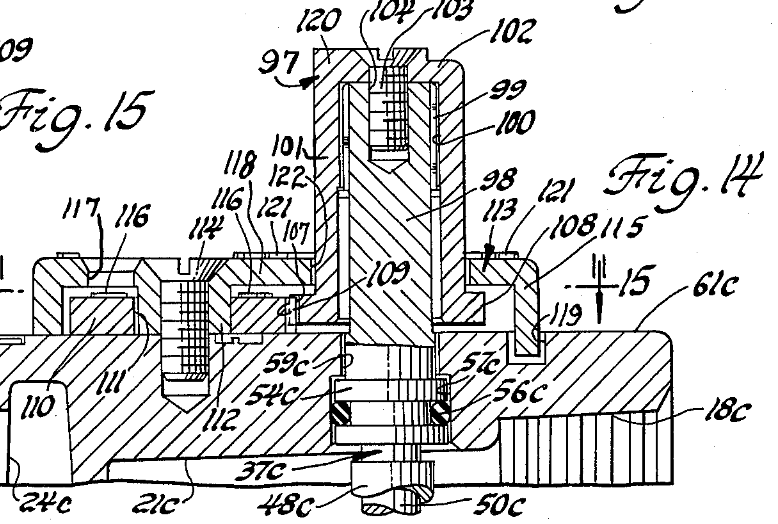
FIG. 14 is a fragmentary, elevation section view of the valve structure illustrated in FIG. 13, taken along the line 14—14 thereof, and looking in the direction of the arrows.

FIGS. 13, 14 and 15 illustrate a fourth embodiment of the invention, and the parts of this embodiment which are the same as the parts of the first embodiment of FIGS. 1 through 7 have been marked with the same reference numerals followed by the small letter "c". The valve **10*c* employs the same valve body, check valve and flow control valve as used in the first embodiment. The fourth embodiment of FIGS. 13 through 15 illustrates a non-rising stem structure made in accordance with the principles of the present invention, and it includes a turn counter mechanism for indicating the number of turns of the valve stem 37*c*. In the fourth embodiment of FIGS. 13 through 15, the valve stem 37*c* is provided with an axial, outwardly extended portion 98 which has external spline teeth 99 formed around the periphery of the outer end thereof that mate with internal spline teeth 100 formed in the inner side of the cylindrical wall portion 101 of a flow control adjusting knob, generally indicated by the numeral 97. The top end wall of the adjusting knob 97 is designated by the numeral 102. As shown in FIG. 14, the adjusting knob 97 is operatively retained on the valve stem extension 98 by the spline teeth 99 and 100, and a retainer screw 103. The retainer screw 103 extends through a suitable bore formed through the knob upper end wall 102, and into threaded engagement with a threaded bore 104 that is formed in the upper end of the valve stem extension 98. The adjusting knob 97** may be made from any suitable material, as from a suitable plastic.

As shown in FIGS. 13 and 14, an indicator pointer 120 is integrally formed on the knob upper end wall 102. As shown in FIG. 13, the periphery of the adjusting knob 97 is knurled to provide for a good grip for manually turning the knob 97.

As shown in FIG. 14, the adjusting knob 97 has a radially extended peripheral flange 108 integrally formed on the lower end thereof. The flange 108 has formed thereon a radially outward extended single gear tooth 109. As illustrated in FIG. 15, the gear tooth 109 on the flange 108 is adapted to engage the teeth 107 formed on a turn counter wheel 110 for indicating the number of turns made by the knob 97. As shown in FIG. 14, the turn counter wheel 110 has an axial bore 111 for rotatably mounting the wheel 110 on a shaft 112 which is integrally formed on the inner side of a rectangular cover, generally indicated by the numeral 113. The cover 113 is secured in position on the top end surface 61*c* of the valve body 11*c* by a suitable retainer screw 114. As shown in FIG. 14, one end of the cover 113 is provided with a right angle flange 115 which is adapted to be seated in a transverse slot 119. The adjusting knob 97 extends through an opening 122 in the cover 113.

As shown in FIGS. 13 and 14, the turn counter wheel 110 is provided on its outer face with a plurality of turn indicating numbers 116 which extend over a range of from zero to any desired number, in accordance with the structure of the valve 10*c*. As shown in FIG. 13, the turn indicator numbers 116 are visible to an operator of the valve 10*c* through an opening 117 which is formed through the top end wall 118 of the cover 113. As shown in FIG. 13, a plurality of indicator numbers 121 are integrally formed on the upper side of the cover upper end wall 118, and they extend from the numbers zero to ten, and they are disposed in equally spaced apart positions peripherally around the adjusting knob 97 to indicate tenths of a complete turn of the knob 97. When the knob 97 is turned, the indicator pointer 120 on the top end thereof points to the fraction or tenth of a turn made by the knob 97.

It will be understood that when the adjusting knob 97 is rotated in either direction, as viewed in FIG. 13, that the gear tooth 109 will engage one of the spaces between the teeth 107 on the counter wheel 110, and move the counter wheel 110. If the knob 97 is rotated for one complete revolution, from the closed position of the associated valve element in the positive or counterclockwise direction, the numeral 1 will appear in the opening 117, as viewed in FIG. 13. It will be seen that the counter wheel 110 thus counts each individual complete rotation of the valve stem 37*c*, and that the numbers 121 on the top end of the cover wall indicate the 1/10 fractional portions of one complete turn of the valve stem 38*c*. The turn indicator structure of the embodiment of FIGS. 13, 14 and 15 permits the user of the valve 10*c* to make precise repeated settings of the valve element of that embodiment.

INDUSTRIAL APPLICATION

The flow control valve of the present invention is adapted for use in industrial applications for controlling the flow of pressurized fluid to a fluid controlled apparatus, where fluid flow control is required in one direction of fluid flow and a free flow of fluid is required in the other direction of fluid flow. An example is the use of the valve for controlling the operation of a fluid cylinder.

I claim:

1. A fluid flow control valve for controlling the flow of pressurized fluid in a flow circuit that includes a fluid controlled apparatus, characterized in that the valve includes:

(a) a valve body having a first fluid port and a second fluid port, and an upper passageway formed in said valve body and extended inwardly from said first fluid port, and a lower passageway formed in said valve body and extended inwardly from said second fluid port and under said upper passageway, and a dividing wall having a first opening and a second parallel opening between said upper and lower passageways, and a first and second circular valve seat formed on the lower end of said first and second openings, respectively, and said lower passageway having an opening to the exterior of the valve body which is enclosed by a releasably mounted bottom cover plate:

(b) a flow control valve means operatively mounted in said first dividing wall opening and having a valve element adjustably movable between open and closed positions relative to said first valve seat to provide a controlled flow of fluid under pressure when pressurized fluid is flowing through said passageways in one direction from said first fluid port to said second fluid port;

(c) a check valve means operatively mounted in said second dividing wall opening in parallel with said flow control valve means, and disposed in a closed position on said second valve seat when pressurized fluid is flowing through said passageways in said one direction and movable to an open position to provide a free flow of fluid through said passageways in the other direction from said second fluid port to said first fluid port;

(d) said flow control valve means including the flow control valve element in the lower passageway adjustable toward and away from said first valve seat and a non-rising valve stem operatively connected to said flow control valve element for adjustment exterior of the valve body for adjusting the valve element relative to said first valve seat without axial movement of the valve stem, to close and open the flow control valve means;

(e) said non-rising valve stem has an integral cylindrical head on the upper end thereof which is rotatably mounted in a bore formed through the upper end of the valve body and extending from the top end surface thereof into communication with the upper passageway, and said valve stem head includes an annular flange;

(f) said valve element has an axial bore therethrough which is partially threaded, and said valve stem having a lower, integral threaded end that extends through the axial bore in said valve element and threadably engages the valve element and has its outer end in abutting engagement with the valve body bottom cover plate; and, (g) said valve body includes means for restraining axial movement of the valve stem when it is rotated, including a shoulder in the bore in the upper end of the valve body which engages the annular flange on the valve stem to restrain said axial movement in an upward direction, the said axial movement is restrained in the downward direction by the valve body bottom cover plate, whereby when the valve stem is rotated the flow control valve element is adjusted relative to said first valve seat without axial movement of the valve stem.

2. A fluid control valve as defined in claim 1, characterized in that:

(a) said valve body includes a plurality of flat surfaces formed perpendicular to the longitudinal axis of the valve stem and disposed in annularly spaced apart positions around the valve element and below the first valve seat, and when said flow control valve element is moved by said valve stem in said valve body it is provided with an axial, non-rotative adjustment, relative to said first valve seat, by a plurality of mating flat surfaces on the valve element which slides on said flat surfaces on the valve body.

3. A fluid flow control valve as defined in claim 2, characterized in that:

(a) said check valve means comprises a spring biased check valve with an O-ring seal adapted to seat on said first valve seat when the check valve is in a closed position.

4. A fluid flow control valve as defined in claim 2, characterized in that:

(a) said non-rising stem is provided with locking means for locking it in a rotated adjusted position.

5. A fluid flow control valve as defined in claim 2, characterized in that:

(a) said valve includes means for releasably mounting the valve in a mounting panel.

6. A fluid flow control valve as defined in claim 2, characterized in that:

(a) said valve includes a turn counter and turn indicator means operated by the non-rising stem.

* * * * *